United States Patent [19]

Shariff et al.

[11] 4,199,655
[45] Apr. 22, 1980

[54] CIRCUIT BREAKER WITH INSULATED HORIZONTAL BUS BARS

[75] Inventors: Sadiq A. Shariff, Palos Park; John R. Wilson, Darien; Brij M. Bharteey, Bolingbrook; Neal E. Rowe, Oak Forest, all of Ill.

[73] Assignee: Westinghouse Electric Corp., Pittsburgh, Pa.

[21] Appl. No.: 946,702

[22] Filed: Sep. 28, 1978

[51] Int. Cl.² .......................... H02G 5/06; H02B 1/20
[52] U.S. Cl. .............................. 174/72 B; 174/149 B; 361/341; 361/361; 361/334
[58] Field of Search ............... 361/334, 356, 358, 361, 361/363, 335, 378, 341, 342; 174/70 B, 71 B, 72 B, 129 B, 133 B, 99 B, 140 B

[56] References Cited

U.S. PATENT DOCUMENTS

| | | | |
|---|---|---|---|
| 4,024,441 | 5/1977 | Coyle | 361/334 |
| 4,025,826 | 5/1977 | Wilson | 361/334 |
| 4,142,224 | 2/1979 | Wilson | 361/356 |

Primary Examiner—Gerald P. Tolin
Attorney, Agent, or Firm—L. P. Johns

[57] ABSTRACT

A control center characterized by horizontal bus bars having electrically insulating covers thereon which covers are in surface-to-surface contact with the surfaces of the bus bars except for removable surface portions for providing electrical connection with vertical bus bars, the removable surface portions being disposed in a pattern to enable alignment of said removable portions with the vertical bus bars when the barriers are assembled with the horizontal bus bars in either upright or inverted positions.

5 Claims, 11 Drawing Figures

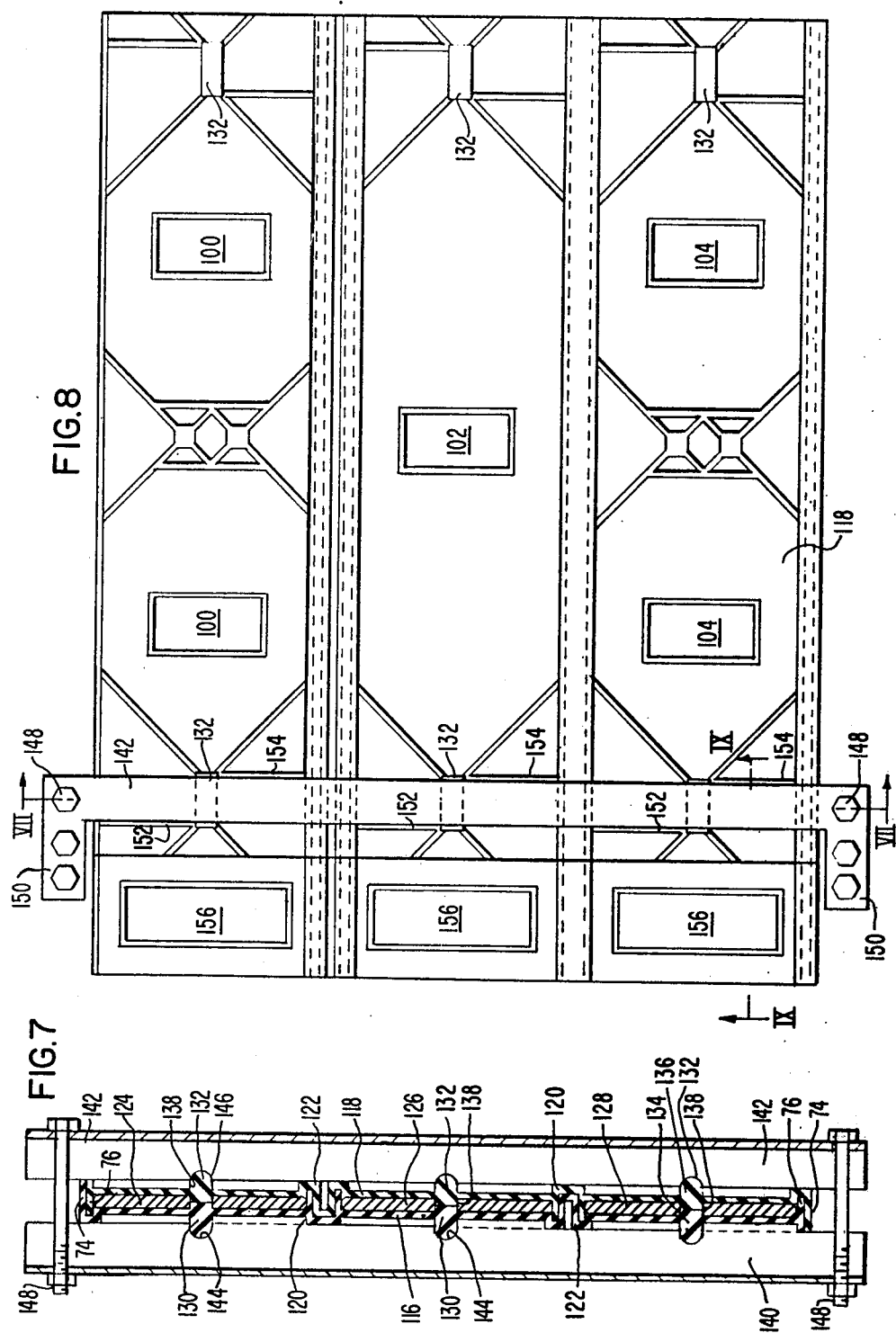

CIRCUIT BREAKER WITH INSULATED HORIZONTAL BUS BARS

CROSS REFERENCE TO RELATED APPLICATIONS

This invention relates to the copending applications of John R. Wilson, Ser. No. 792,837, filed May 2, 1977; John R. Wilson and Jerome C. Wolski, Ser. No. 794,910, filed May 9, 1977; Sadiq A. Shariff, Brij M. Bharteey, Neal E. Rowe, Ser. No. 831,718, filed Sept. 9, 1977; and John R. Wilson, Brij M. Bharteey, Neal E. Rowe, Ser. No. 831,719, filed Sept. 9, 1977.

BACKGROUND OF THE INVENTION

1. Field of the Invention

This invention relates to a control center and, more particularly, to insulated and isolated horizontal bus bars therein.

2. Description of the Prior Art

In modern electrical apparatus, there is increased attention devoted to operator safety as well as minimizing damage to equipment due to short circuits. In a motor control center, the distribution of power by the bus bar system is a vital factor which influences the whole design concept. More specifically, the horizontal bus bar distributes power to a number of vertical bus bars connected to it. Consequently, there is interaction between the bus bar system and other design-criteria that must be met. Such criteria include insulation and isolation of the three phases to provide operator safety and fault prevention, the provision of adequate cooling means, bracing the horizontal bus bars for various short circuit current withstandability requirements, accommodation of horizontal bus bars of varying ampacities, provision of electrical joints between the horizontal bus and the vertical bus bars, providing splice plate connections for extending the horizontal bus, and permitting bolting of risers/cable lugs for incoming lines.

Patents disclosing insulated bus bars in various aspects are U.S. Pat. Nos. 3,096,131, 3,113,820, 3,170,092, 3,840,785, 4,024,441, and 4,025,826.

SUMMARY OF THE INVENTION

It has been found in accordance with this invention that the foregoing considerations are satisfied by providing a plurality of vertical compartments on the front side of the cabinet, a plurality of horizontal vertically-spaced bus bars in said cabinet and electrically connected to corresponding vertical bus bars, an electrically-insulative barrier encasing the horizontal bus bars with the surfaces of each bus bar being in surface-to-surface contact with the barrier, the barrier being substantially coextensive with the bus bars and consisting of a dielectric material having good heat transfer properties, the barrier comprising a sheet-like member on each side of the spaced bus bars which members have interfitting portions including a flange-receiving groove in one member and a flange in the other member and extending between each pair of adjacent bus bars, the sheet-like members on opposite sides of the bus bars being substantially coextensive, the barriers having removable surface portions to provide excess to effect connection of the horizontal bus bars with the vertical bus bars, the removable surface portions being disposed in a pattern to enable alignment of said portions with the vertical bus bars when the barriers are assembled on the horizontal bus bars in either upright or inverted positions.

In addition, there are preferably three horizontal, vertically-spaced bus bars, each horizontal bus bar having connecting means at one end for connection to electrical conduits of a power supply source, the horizontal bus bars being mountable with the connecting means disposed at the right or left side of the assembled bus bars, the barriers having a pair of horizontally-spaced removable portions aligned with each upper and lower horizontal bus bar and aligned with a pair of corresponding vertical bus bars, the barriers having a removable portion aligned with the center horizontal bus bar and with the corresponding vertical bus bar, the barriers when assembled providing isolated compartments in which the vertically-spaced, horizontal bus bars are mounted, the barriers having mounting means for supporting the horizontal bus bars in each compartment, the assembly of the horizontal bus bars and barriers being mounted between horizontally-spaced vertical mounting braces, the braces being disposed in pairs on opposite sides of the assembly, and the barriers and the braces comprising interfitting means for retaining the assembly in secure engagement with the braces.

The advantage of the device of this invention is that it provides for operator safety by encasing the horizontal bus bars and accommodates bus bars of various ampacities. In addition, the barriers comprise removable surface portions to enable good electrical connection between the horizontal bus bars and corresponding vertical bus bars which removable surface portions are disposed in a pattern to enable alignment of said portions with the vertical bus bars whether the horizontal bus bars are connected to a power source at the right or left ends thereof. Moreover, the barriers when assembled in pairs provide isolated compartments in which the horizontal bus bars are mounted and mounting means for supporting the horizontal bus bars are an integral part of the barriers.

BRIEF DESCRIPTION OF THE DRAWINGS

FIG. 7 is a vertical sectional view of the assembly of horizontal bus bars, insulative barriers and support braces of another embodiment of the invention;

FIG. 8 is a vertical plan view of another embodiment of the insulative barrier;

DESCRIPTION OF THE PREFERRED EMBODIMENTS

Figure 1:
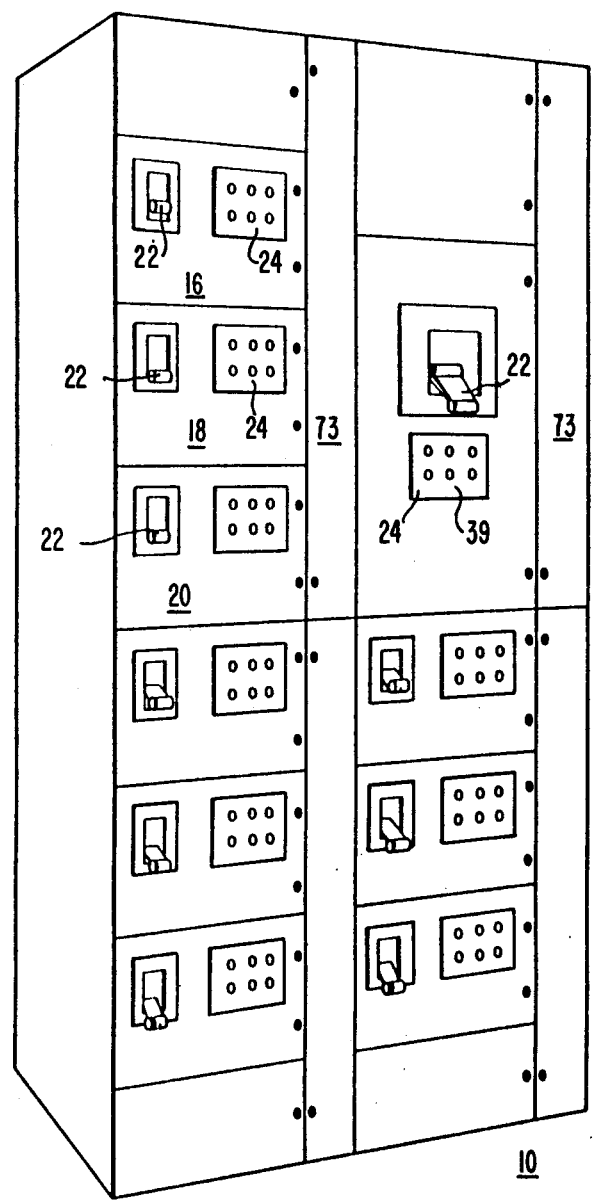
FIG. 1 is a perspective view of an electrical control center in accordance with this invention.

The control center of this invention is similar to that shown in U.S. Pat. Nos. 4,024,441 and 4,025,826. The control center is generally indicated at 10 in FIG. 1 and comprises a metal cabinet having a plurality of vertically-disposed compartments, such as a compartment 12 (FIG. 2), to accommodate circuit breakers, such as the circuit breaker 14 in the compartment 12. Each compartment includes an access door, such as doors 16, 18, 20 (FIG. 1), which doors are provided with appropriate openings to accommodate portions of circuit breakers, such as handles 22 or indicator panel lights 24 as required.

Figure 2:
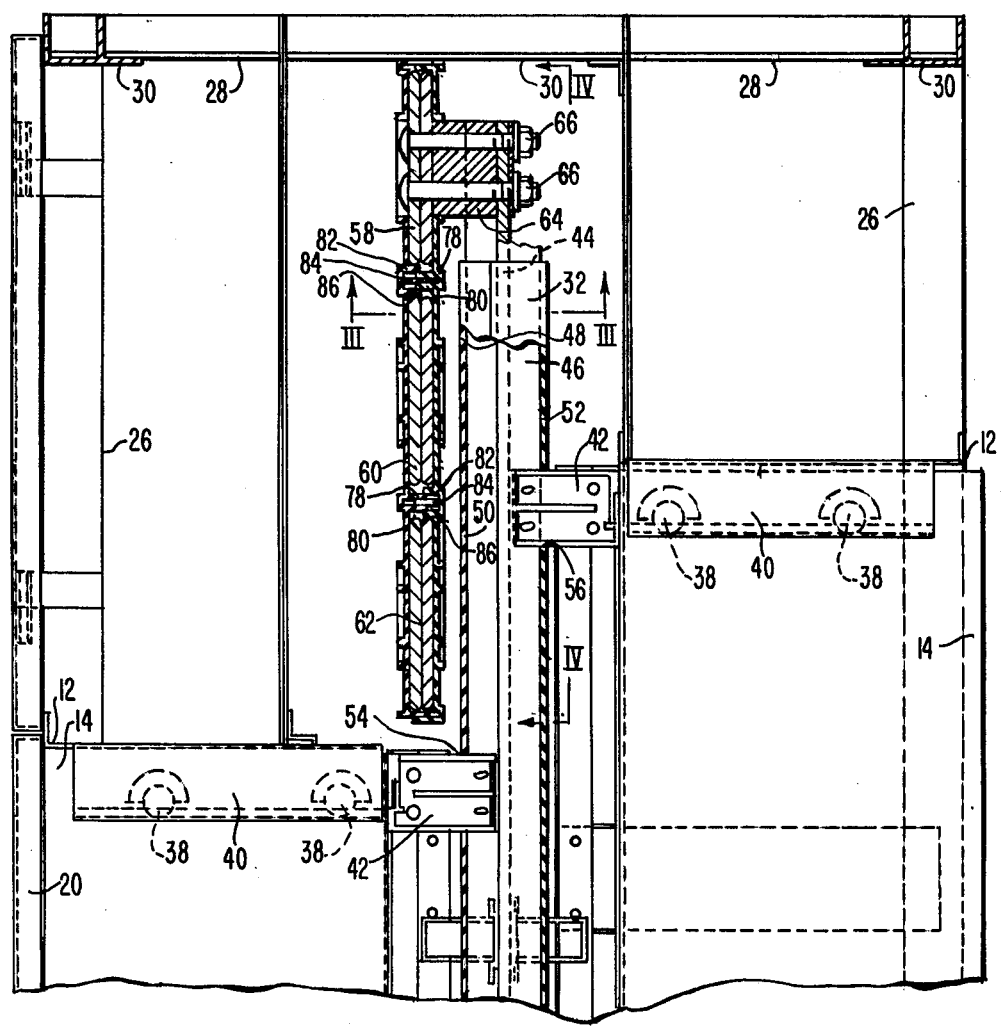
FIG. 2 is a vertical sectional view through the upper portion of the control center.

The cabinet 10 comprises a rectangular steel framework consisting of U-shaped corner posts 26 (FIG. 2) and horizontal interconnectors 28, 30 at upper and lower ends in a conventional manner. The front and rear sides of the control cabinet 10 include compartments similar to the compartment 12 on the front side into which circuit breakers 14 are inserted from opposite sides of vertical bus bars 32, 34, 36 (FIGS. 2, 4) which are centrally disposed between front and rear sides of the control center 10. The device of this invention, however, is operative similarly where the rear side of the control center is not adapted for the mounting of circuit breakers 14. Suffice it to say, as shown in FIG. 2 the circuit breakers 14 comprise a pair of mounting members, such as rollers 38, which extend from each opposite side wall and engage similar mounting tracks or guides 40 which depend from adjacent frame members such as corner posts 26. Each circuit breaker 14 is provided with plug-in stabs 42 that engage the vertical bus bars 32–36 which are Z-shaped members (FIG. 3) comprising intermediate portions 44 and legs 46, 48 extending in opposite directions and from opposite edges of intermediate portion. Thus, the leg 46 extending to the right of the intermediate portion 44 is engaged by plug-in stabs 42 on the right side of the control center 10, and the leg 48 on the left side of the intermediate portion 44 is engaged by clips 42 of the circuit breaker on the left side of the control center 10.

Figure 3:
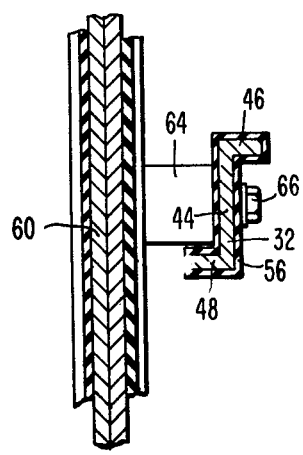
FIG. 3 is a horizontal sectional view taken on the line III—III of FIG. 2.

As shown in FIGS. 2, 3, the vertical bus bars 32, 34, 36 are contained within a pair of insulating and isolating barriers 50, 52 in a manner similar to that shown in U.S. Pat. No. 4,024,441, which barriers are provided with spaced openings 54, 56, respectively, through which the several plug-in stabs 42 extend to obtain electrical connection with the corresponding legs 46, 48 of the vertical bus bars 32, 34, 36.

A plurality, preferably three, horizontal bus bars 58, 60, 62 are disposed at the upper end of the electric control center 10 where they are mounted in vertically-spaced positions for connection with the upper ends of the corresponding vertical bus bars 32, 34, 36, respectively. Good electrical connections between the vertical and horizontal bus bars are provided by suitable means, such as a conductor-spacer 64, which is disposed between each pair of corresponding vertical and horizontal bus bars by nut and bolt assemblies 66.

Figures 4, 5:
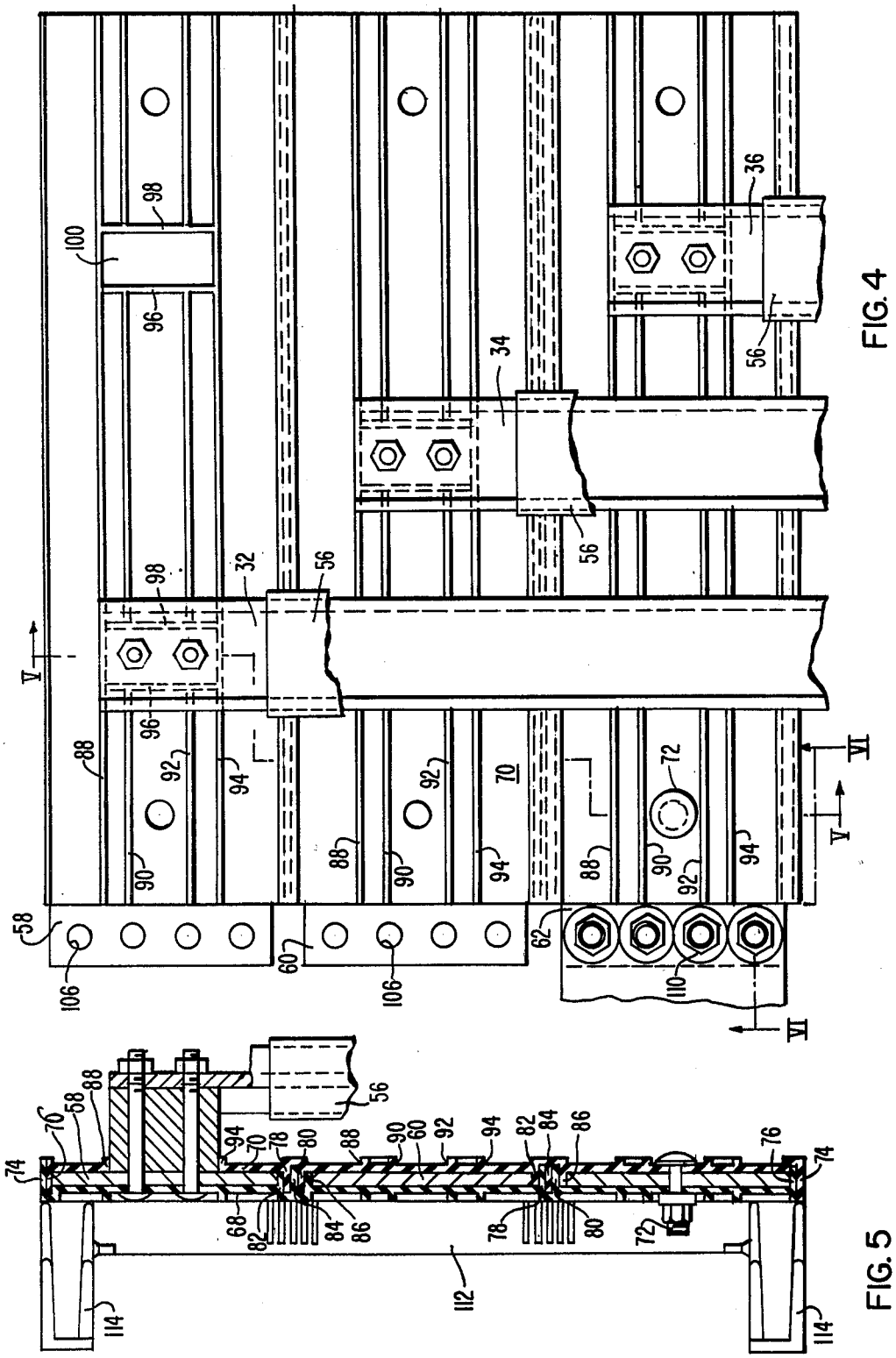
FIG. 4 is a vertical sectional view taken on the line IV—IV of FIG. 2.
FIG. 5 is a vertical sectional view through the assembly of horizontal bus bars and barriers of another embodiment of the invention.

In accordance with this invention as shown in FIGS. 2–5, the horizontal bus bars 58, 60, 62 are encased within covers or barriers 68 and 70 which are sheet-like members which are substantially coextensive with the bus bars and which consist of an electrically insulative material having good heat transfer properties. The barriers 68, 70, in surface-to-surface contact with the bus bars, are identical in configuration and are retained together by suitable means, such as nut and bolt assemblies 72, in aligned holes in the barrier 68, 70 and the corresponding bus bar 62 (FIG. 5).

As stated above, the separable barriers 68 and 70, being produced in similar molds, include similar upper and lower flanges 74, 76. Likewise, they comprise interfitting or labyrinth members including spaced flanges 78, 80 which interfit with spaced flanges 82, 84, 86 on the opposite member. In this manner, the interfitting members 78–86 provide the required electrical creepage distance between the phases of the spaced bus bars 58, 60, 62.

In addition, the assembled barriers 68, 70 provide isolated compartments in which the horizontal bus bars 58, 60, 62 are mounted. The barriers 68, 70 include mounting means, such as the flanges 82, 84, and 86, for supporting the horizontal bus bars in each compartment.

As shown in FIGS. 4 and 5, the barriers 68, 70 comprise reinforcing ribs including similar horizontal ribs 88, 90, 92, and 94 for each horizontal section which cover a bus bar 58, 60, 62. In addition, vertical ribs 96, 98 are disposed at spaced locations between upper and lower horizontal ribs 88, 94, thereby surrounding similar portion or knock-outs 100, 102, 104 which are removable to expose the underlying surfaces of the horizontal bus bars 58, 60, 62 when necessary for connection of a corresponding vertical bus bar 32, 34, 36 as shown in FIGS. 2 and 4.

The locations of the knock-out portions 100, 102, 104 provide a pattern to facilitate the alternate connections between the horizontal and vertical bus bars. Thus, either vertical bus bar 32 or 36 may be attached to either horizontal bus bar 58, 62 as required. Moreover, the horizontal bus bars 58, 60, 62 (FIGS. 4 and 6) are provided with holes 106 for connection of each bus bar to a supply conductor 108 by means of a nut and bolt assembly 110. The connection is provided on the left end of the horizontal bus bars. However, where necessary, the supply conductors 108 are provided at the right end of the horizontal bus bars 58, 60, 62 so that the assembly of the horizontal bus bars and barrier 68, 70 may be turned end-for-end for connection in a manner similar to that shown in FIG. 6. When the assembly is turned in that manner, the knock-out portions 100 and 104 are interchangeable. For that reason, the pattern of locations of the several knock-out portions 100, 102, 104 is adaptable to connection with the vertical bus bars, whether the supply conductors 108 are disposed on the right or left ends of the horizontal bus bars.

Figure 6:
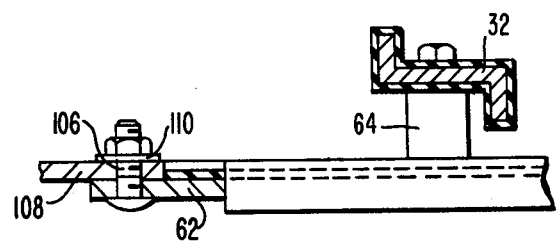
FIG. 6 is a horizontal sectional view taken on the line VI—VI of FIG. 4.

In FIGS. 5, 6, the assembly of the horizontal bus bars 58, 60, 62 and the barriers 68, 70 are secured together by the nut and bolt assembly 72 by which the assembly is also mounted on support means including a pair of horizontally-spaced vertical braces 112, the upper and lower ends of which (FIG. 5) include outturned portions 114 by which the braces are secured to a suitable member of the supporting frame of the control center 10.

Figure 9:
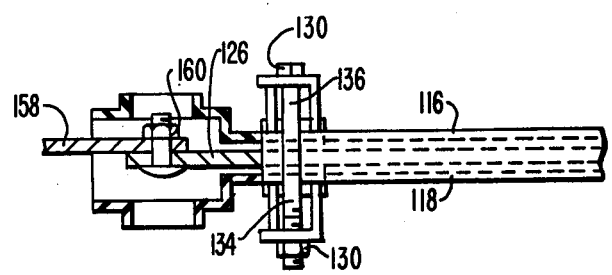
FIG. 9 is a horizontal sectional view taken on line IX—IX of FIG. 8.

Another embodiment of the structure of the barriers is shown in FIGS. 7, 8, and 9 which comprise a pair of barriers 116, 118. Like the barrier 68, 70, the barriers 116, 118 (FIG. 7) include flanges 74, 76 at the upper and lower edges thereof. The barriers 116, 118 include interfitting means including U-shaped or female portions 120 and projecting portions 122 which are oppositely-disposed for the upper and lower locations between the vertically-spaced horizontal bus bars 124, 126 and 128. The interfitting barriers 116, 118 are interchangeable and are made in similar molds. More particularly, the barriers 116, 118 differ from the barriers 68, 70 in that the former are provided with projections or buttons 130, 132 extending from the outer surfaces thereof at horizontally-spaced locations (FIG. 8) of the barriers. Each projection 130, 132 includes an inturned portion 134, 136, respectively.

The inturned portions 134, 136 serve as mounting means for supporting the horizontal bus bars in place. For that purpose, each bus bar 124, 126, 128 includes a similar aperture 138 into which the interfitting barriers 116, 118 project (FIG. 7) to maintain the horizontal bus bars in proper alignment within the barriers.

The projections 130, 132, extending from the outer surfaces of the respective barriers, are engaged by oppositely-disposed pairs of braces 140, 142. The braces 140, 142 are channel-like members (FIG. 8) and comprise spaced notches 144, 146 for engaging the projections 130, 132. By providing upper and lower clamping bolt assemblies 148, the assembly of the horizontal bus bars, the barriers, and the braces are retained together. The upper and lower ends of each pair of braces 140, 142 include outturned members 150 by which the assembly of the bus bars and barriers are mounted to a suitable part of the frame of the control center 10.

As shown in FIG. 8, the barrier 118, which is representative of both barriers 116, 118 is provided with reinforcing ridges including vertical ridges 152, 154 which are horizontally-spaced for engagement with the outer legs of the channeled braces 140, 142 to further help to maintain the assembly of the barriers and braces in place when electrical stresses occur between the horizontal bus bars 124, 126, 128. Like the barriers 68, 70, the barriers 116, 118 include removable surface portions or knock-outs similar to the knock-out portions 100, 102, 104. Additionally, similar knock-out portions 156 (FIG. 9) are provided at the ends of the barriers 116, 118 to cover the connections between the horizontal bus bars 124, 126, 128 and corresponding supply conductor 158. For that purpose, a nut and bolt assembly 160 is provided to maintain good electrical connection between the connected parts.

Figure 10:
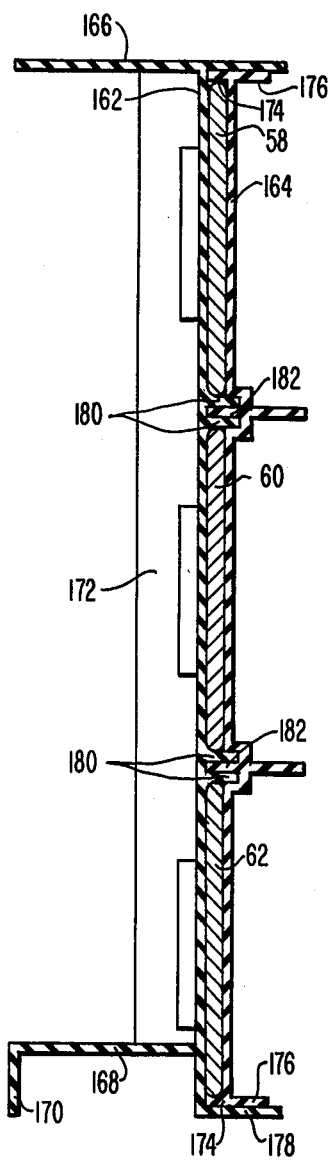
FIG. 10 is a vertical sectional view of horizontal bus bars and protective barriers of another embodiment of the invention.
Figure 11:
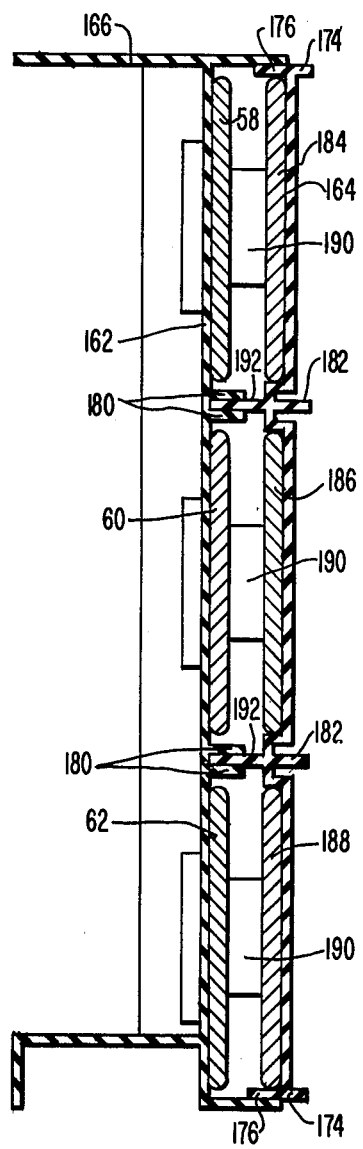
FIG. 11 is a vertical sectional view through the assembly of horizontal bus bars and barriers of another embodiment of the invention.

Another embodiment of the invention is shown in FIG. 10 in which horizontal bus bars 58, 60, 62 are disposed between oppositely-disposed barriers 162, 164. The barriers 162, 164 differ in construction from each other in that the upper end includes a flange 166 extending from the upper end of the sheet-like barrier 162 and, at the lower end, a flange 168 extends from the surface of the barrier. Moreover, the barrier 162 is primarily a channel member having a pair of channel legs of which one leg 172 is shown in FIG. 10. The flanges 166, 168, 170 together with the channel legs 172 provide the barrier 162 with integral means for mounting the assembly of the horizontal bus bars and barriers 162, 164 in place on suitable frame members of the control center 10. In addition, the barrier 164 comprises upper and lower flanges 174 as well as oppositely-disposed upper and lower flanges 176 which are disposed within flanges 166 and 178 of the barrier 162. Both barriers 162, 164 comprise interfitting portions for minimizing electrical creepage between the bus bars by providing similar spaced members 180 into which a rib 182 projects from the opposite barrier 164, thereby providing the required electrical creepage distance between the faces or bus bars 158, 160, 162.

Where additional capacity is required, additional bus bars 184, 186, 188 (FIG. 11) are provided in conjunction with the corresponding bus bars 58, 60, 62 with suitable conductor spacers 190 disposed therebetween. Inasmuch as the spacing between the barriers 162, 164 (FIG. 11) is greater than that shown for a single bus bar assembly (FIG. 10), a rib 192 of greater length than the rib 182 is provided on the barrier 162 for each location between corresponding pairs of bus bars in order to maintain the required electrical creepage distance between the faces. Thus, the barriers 162, 164 are adapted for use with one or more bus bars as shown in FIGS. 10 and 11.

What is claimed is:

1. A control center for distributing electric power from a power supply source to power consuming devices, comprising a cabinet having a plurality of vertical compartments on the front side of the cabinet, a plurality of vertical, horizontally-spaced bus bars in said cabinet, a plurality of horizontal, vertically-spaced bus bars in said cabinet and electrically connected to corresponding vertical bus bars, an electrically-insulative barrier encasing the horizontal bus bars with the surfaces of each bus bar being in surface-to-surface contact with the barrier, the barrier being substantially coextensive with the bus bars and consisting of a dielectric material having good heat transfer properties, the barrier comprising a sheet-like member on each side of the spaced bus bars which members have interfitting portions including a flange-receiving groove in one member and a flange in the other member and the interfitting portions extending between each pair of adjacent horizontal bus bars, the sheet-like members on opposite sides of the bus bars being substantially coextensive, the barrier having removable surface portions to provide access to effect connection of the horizontal bus bars with the vertical bus bars, the removable surface portions being aligned with the vertical bus bars, and mounting means for supporting the horizontal bus bars and comprising at least one aperture in each horizontal bus bar and a projection in at least one of the barrier members extending into the aperture of each bus bar.

2. The control center of claim 1 in which there are three horizontal, vertically-spaced bus bars, each horizontal bus bar having connecting means at one end for connection to electrical conduits of a power supply source, the horizontal bus bars being mounted with the connecting means disposed at the right or left side of the assembled bus bars, the barrier having a pair of horizontally-spaced removable portions aligned with each upper and lower horizontal bus bar and aligned with a pair of corresponding vertical bus bars, and the barrier having a removable portion aligned with the center horizontal bus bar and with the corresponding vertical bus bar.

3. The control center of claim 2 in which the barrier provides isolated compartments in which the vertically-spaced horizontal bus bars are mounted, and the barrier has mounting means for supporting the horizontal bus bars in each compartment.

4. The control center of claim 2 in which the assembly of the horizontal bus bars and barrier is mounted between horizontally-spaced vertical mounting braces, and the braces being disposed in pairs on opposite sides of the assembly.

5. The control center of claim 4 in which the barrier and the braces comprise interfitting means for retaining the assembly in secure engagement with the braces.

* * * * *